United States Patent
Kazama et al.

[11] Patent Number: 5,711,342
[45] Date of Patent: *Jan. 27, 1998

[54] MASS FLOW CONTROLLER, OPERATING METHOD AND ELECTROMAGNETIC VALVE

[75] Inventors: Yoichiro Kazama, Mie-ken; Tomihisa Oyama, Fukaya; Makoto Tanaka, Yokkaichi; Makoto Ishikawa, Kuwana, all of Japan

[73] Assignee: Hitachi Metals, Ltd., Tokyo, Japan

[*] Notice: The term of this patent shall not extend beyond the expiration date of Pat. No. 5,447,173.

[21] Appl. No.: 495,701

[22] Filed: Jun. 27, 1995

Related U.S. Application Data

[63] Continuation of Ser. No. 279,165, Jul. 22, 1994, Pat. No. 5,447,173.

[30] Foreign Application Priority Data

Jul. 23, 1993 [JP] Japan ..................... 5-182401
Apr. 22, 1994 [JP] Japan ..................... 6-084313

[51] Int. Cl.$^6$ ........................................... G05D 7/06
[52] U.S. Cl. .................. 137/486; 137/487.5; 251/129.08
[58] Field of Search ........................ 137/8, 486, 487.5; 251/129.08

[56] References Cited

U.S. PATENT DOCUMENTS

| | | | |
|---|---|---|---|
| 4,921,005 | 5/1990 | Ohmi | 137/486 |
| 4,984,460 | 1/1991 | Isoda | |
| 5,062,446 | 11/1991 | Anderson | 137/486 X |
| 5,100,100 | 3/1992 | Benson | 137/486 X |
| 5,447,173 | 9/1995 | Kazama et al. | 137/875 X |

FOREIGN PATENT DOCUMENTS

| | | |
|---|---|---|
| 61-128123 | 6/1986 | Japan . |
| 1-150817 | 6/1989 | Japan . |
| 1-241103 | 9/1989 | Japan . |
| 3-000554 | 1/1991 | Japan . |

OTHER PUBLICATIONS

"A calibration system for calorimetric mass flow device," Widmer et al., J. Phys. E. Sci. Instrum., vol. 15, pp. 213–219, 1982.

Primary Examiner—Stephen M. Hepperle
Attorney, Agent, or Firm—Finnegan, Henderson, Farabow, Garrett & Dunner

[57] ABSTRACT

A mass flow controller comprising (a) a valve casing having a flow path for a fluid; (b) an electromagnetic actuator comprising a stationary yoke made of a soft magnetic material, an electromagnetic coil for magnetizing the stationary yoke, and a movable yoke made of a soft magnetic material and movable toward the stationary yoke, both of the stationary yoke and the movable yoke having a magnetic flux density of 1.5 T or more at 300 AT/m, whereby the temperature elevation of the valve casing is within 4° C. from ambient temperature when the electromagnetic coil is energized; (c) a diaphragm valve means disposed in the flow path for adjusting the degree of opening the flow path; (d) a sensor pipe disposed on the upstream side of the diaphragm valve means and bypassing the flow path; and (e) a pair of sensor coils wound around the sensor pipe on the upstream and downstream sides.

7 Claims, 5 Drawing Sheets

FIG. 5

MASS FLOW CONTROLLER, OPERATING METHOD AND ELECTROMAGNETIC VALVE

This is a continuation of application Ser. No. 08/279,165, filed Jul. 22, 1994 now U.S. Pat. No. 5,447,173.

BACKGROUND OF THE INVENTION

The present invention relates to a mass flow controller for controlling a mass flow of a fluid, particularly a mass flow controller whose valve element is operated by an electromagnetic actuator, and an electromagnetic valve suitable for such a mass flow controller.

A mass flow controller functions to measure a mass flow of a fluid flowing through a sensor pipe branched from a flow path of a valve casing with sensor coils wound around the sensor pipe. An operating voltage is applied to an electromagnetic actuator for moving a valve element in accordance with the difference between a predetermined value and a measured value, and the degree of opening a valve element is adjusted to control the mass flow of a fluid. The actuator is usually constituted by a stack of piazo elements to obtain a large valve element-driving force. Since the piazo elements can be operated simply by applying voltage without flowing electric current, heat generation can be avoided. However, it is difficult to obtain a large stroke of movement. For instance, in the case of a piazo element stack of 40 mm in thickness constituted by 400 piazo elements of 100 μm in thickness, a stroke of movement is only 40 μm.

A large stroke of movement can be obtained by an electromagnetic actuator usually used in an electromagnetic valve. In the electromagnetic actuator, electric current is caused to flow through a coil to generate a magnetic field, whereby a magnetic attraction force is generated in a soft magnetic body. In order to produce a large force by an electromagnetic actuator, it is necessary to generate a large magnetic field, namely it is necessary to increase the number of winding of a coil or electric current flowing through the coil. When a large magnetic attraction force is generated by flowing electric current through the coil, heat is inevitably generated from the coil, leading to temperature elevation in the coil and its yokes, and thus to temperature elevation in the valve casing. This temperature elevation in turn results in the change of temperature in the sensor coils, thereby generating errors in the measurement of the mass flow of a fluid with the sensor coils.

Sensor coils each consisting of a heat-generating resistance wire are wound around the sensor pipe on both upstream and downstream sides. The sensor coils are kept at a temperature higher than an ambient temperature (usually room temperature) by 30°–60° C., and the heat of the sensor coil on the upstream side is conveyed to the downstream side by a gas flowing through the sensor pipe. As shown in FIG. 6 of J. Phys. E. Sci. Instrum., Vol. 15 (1982), 215, a temperature difference between the coils on the upstream and downstream sides is measured as unbalanced bridge voltage. Alternatively, as described in Japanese Patent Laid-Open No. 61-128123, voltage applied to the sensor coils is changed such that electric current for compensating the temperature change flows through the sensor coils, thereby measuring the change of voltage in the sensor coils to determine the mass flow of a fluid flowing through the sensor pipe.

With respect to the change of ambient temperature, as described in Japanese Patent Laid-Open No. 1-150817, a bridge circuit is provided with a resistance for measuring an ambient temperature, keeping constant a difference between the temperature of the sensor coils and the ambient temperature, so that the change of the ambient temperature does not lead to measurement errors of the mass flow.

However, it has been found that complete compensation of the influence of the temperature change of the valve casing on the gas temperature and the measurement of the mass flow would be difficult.

OBJECT AND SUMMARY OF THE INVENTION

Accordingly, an object of the present invention is to provide a mass flow controller having an electromagnetic actuator with a sufficient valve element-driving force without suffering from a large increase in the temperature of a valve casing.

Another object of the present invention is to provide a method for operating a mass flow controller at a sufficient valve element-driving force with little heat generation of the valve casing.

A further object of the present invention is to provide an electromagnetic valve displaceable depending on voltage applied.

Thus, the mass flow controller of the present invention comprises a valve casing having a flow path for a fluid; a valve element disposed in the flow path for adjusting the degree of opening the flow path; and an electromagnetic actuator for operating the valve element, the electromagnetic actuator comprising a stationary yoke made of a soft magnetic material, an electromagnetic coil for magnetizing the stationary yoke, and a movable yoke made of a soft magnetic material and movable toward the stationary yoke by energizing the electromagnetic coil, the stationary yoke and the movable yoke having a magnetic flux density of 1.5 T (tesla) or more at 300 AT/m, the temperature elevation of the valve casing being within 4° C. from ambient temperature when the electromagnetic coil is energized.

In a preferred embodiment, the mass flow controller comprises:
(a) a valve casing having a flow path for a fluid;
(b) an electromagnetic actuator comprising a stationary yoke made of a soft magnetic material, an electromagnetic coil for magnetizing the stationary yoke, and a movable yoke made of a soft magnetic material and movable toward the stationary yoke by energizing the electromagnetic coil, both of the stationary yoke and the movable yoke having a magnetic flux density of 1.5 T or more at 300 AT/m;
(c) a diaphragm valve means disposed in the flow path for adjusting the degree of opening the flow path, the diaphragm valve means comprising a valve seat disposed in the flow path, a diaphragm biased in the direction away from the valve seat, a valve rod having one end in contact with the diaphragm and the other end fixed to the movable yoke, and a leaf spring mounted to the valve rod and biased toward the valve seat, combined spring forces of the diaphragm and the leaf spring being exerted to the diaphragm such that the diaphragm is forced to fluid-tightly abut the valve seat;
(d) a sensor pipe disposed on the upstream side of the diaphragm valve means and bypassing the flow path; and
(e) a pair of sensor coils wound around the sensor pipe on the upstream and downstream sides.

The present invention also provides a method for operating a mass flow controller comprising a valve casing having a flow path for a fluid and a valve element disposed in the flow path for adjusting the degree of opening the flow path, and an electromagnetic actuator for operating the valve element, the electromagnetic actuator comprising a stationary yoke made of a soft magnetic material, an electromagnetic coil for magnetizing the stationary yoke, and a movable yoke made of a soft magnetic material and movable relative to the stationary yoke, both of the stationary yoke and the movable yoke having a magnetic flux density of 1.5 T or more at 300 AT/m, the method comprising energizing the electromagnetic coil to magnetize the stationary yoke, thereby moving the movable yoke toward the stationary yoke, so that the open degree of the valve element is adjusted, wherein electric current supplied to the electromagnetic coil is controlled such that the temperature elevation of the valve casing is within 4° C. from ambient temperature.

The present invention further provides an electromagnetic valve comprising a valve casing having a flow path for a fluid and a valve element disposed in the flow path for adjusting the degree of opening the flow path, and an electromagnetic actuator for operating the valve element, wherein the valve element is biased toward a valve seat disposed in the flow path; wherein the electromagnetic actuator comprises a stationary yoke made of a soft magnetic material, an electromagnetic coil for magnetizing the stationary yoke, and a movable yoke made of a soft magnetic material and movable toward the stationary yoke against a spring force of a spring mounted to the movable yoke by energizing the electromagnetic coil; wherein both of the stationary yoke and the movable yoke have a magnetic flux density of 1.5 T or more at 300 AT/m, a ratio of a magnetic flux density at 300 AT/m ($B_{300}$) to a magnetic flux density at 50 AT/m ($B_{50}$) being 1.5 or more, whereby the temperature elevation of the valve casing is within 4° C. from ambient temperature when the electromagnetic coil is energized.

DETAILED DESCRIPTION OF THE PREFERRED EMBODIMENTS

Since the mass flow controller of the present invention comprises a stationary yoke and a movable yoke both made of a soft magnetic material capable of generating a large magnetic flux density in a small magnetic field, a large displacement of the movable yoke can be obtained even with a small electric current, thereby keeping the temperature elevation of the valve casing within 4° C., preferably 2° C.

In the present invention, if a magnetic flux density of 2.0 T or more is generated from the stationary yoke and the movable yoke at 300 AT/m, a large magnetic attraction force can be obtained at a further small electric current.

In a state where the electromagnetic coil is not energized in the electromagnetic valve comprising an electromagnetic actuator according to the present invention, the movable yoke is biased to a closed position at which the valve element is forced to fluid-tightly abut a valve seat by a spring, or to an open position at which the valve element is most separated from the valve seat. As the valve element moves to control position against the resilience of the spring by energizing the electromagnetic coil, the resilience of the spring increases. Since the movable yoke is biased by the resilience of the spring, a large magnetic attraction force capable of overcoming the resilience of the spring is necessary to displace the movable yoke. For this reason, the magnetic flux density of the stationary yoke and the movable yoke is desirably 1.5 T or more at 300 AT/m, and a ratio ($B_{300}/B_{50}$) magnetic flux density at 300 AT/m ($B_{300}$) to a magnetic flux density at 50 AT/m ($B_{50}$) is desirably 1.5 or more.

Heat generation from the valve casing is caused by electric current supplied to the electromagnetic coil. Though part of the heat is released from the valve casing or through the piping system, a difference between the heat generated by the supplied electric current and the heat released is accumulated in the valve, leading to the temperature elevation of the valve. Assuming that a constant electric power is supplied to the electromagnetic coil, a heat released from the valve casing is proportional to the difference between the temperature of the valve casing and the ambient temperature. Thus, the following equation applies:

$$\int w\, dt = C(T-T_0) + q \int (T-T_0) dt \qquad (1),$$

wherein w: electric power supplied,

C: heat capacity of the overall valve casing,

T: temperature of the valve casing, $T_0$: initial temperature of the valve casing (ambient temperature), t: time, and q: constant.

The left side of the equation (1) represents electric power supplied, and the first and second terms of the right side represent temperature elevation and heat released, respectively.

The above equation (1) is solved as the following equation:

$$T-T_0 = w\{1-\exp(-qt/C)\}/q \qquad (2).$$

The equation (2) indicates that the temperature elevation of the valve casing is almost w/q after a sufficient period of time (t=∞). Since the value of q is determined by the shape, size and material of the valve casing, the temperature elevation can be controlled to within 4° C., preferably within 2° C. by adjusting the value of w. Since the sensor pipe is mounted to the valve casing, the temperature of the sensor portion increases as the temperature of the valve casing increases by w/q.

Figure 1:
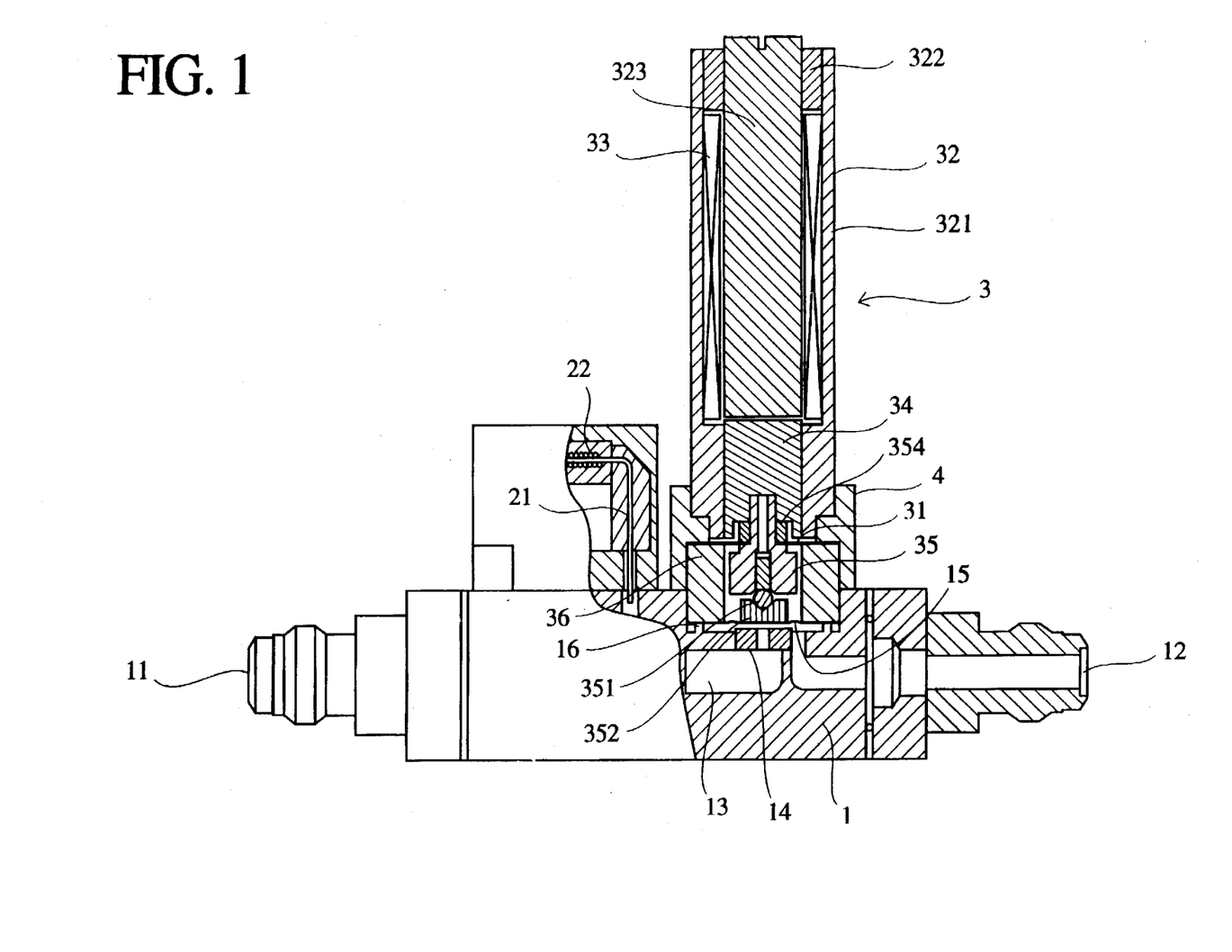
FIG. 1 is a cross-sectional view showing a mass flow controller according to the present invention.

FIG. 1 is a partial cross-sectional view of the mass flow controller of the present invention. The mass flow controller comprises a valve casing 1 having a fluid inlet 11, a fluid outlet 12, and a flow path 13 therebetween, a sensor pipe 21 branched from the flow path 13, sensor coils 22 wound around the sensor pipe 21 on the upstream and downstream sides. A valve seat 14 and a valve element (for instance, a diaphragm valve) 15 are mounted in the flow path 13 of the valve casing 1, and an electromagnetic actuator 3 for controlling the open degree of the valve element 15 relative to the valve seat 14 is mounted to the valve casing 1. By comparing a signal of the flow rate detected by the sensor coils 22 with a predetermined signal received from a control circuit (not shown), voltage applied to the electromagnetic actuator 3 is adjusted to control the open degree of the valve element 15, thereby controlling the mass flow of a fluid flowing through the mass flow controller to a predetermined level.

The fluid whose mass flow is controlled by the mass flow controller may be organic metal compound gases for use in the production of semiconductors, photo-devices, magnetic recording equipment, etc. such as TMB, TEOS, etc.; halogen gases, hydrogen halide gases, and their carrier gases such as nitrogen, argon, helium, and if desired, water steam and oxygen, etc. Since some of these gases are highly corrosive, flow path walls, valve element 15, valve seat 14, and a sensor pipe 21 in the mass flow controller should have sufficient corrosion resistance. Accordingly, these parts are preferably made of SUS 315L, 317L, Ni alloys, Fe-Co alloys, etc. To avoid impurities and water from entering into the fluid, the walls of the flow path 13 are machined and then electrolytically ground.

The sensor coils 22 wound around the sensor pipe 21 on both upstream and downstream sides are made of a platinum resistance wire with an insulating outer layer, etc., and kept at a temperature higher by several tens of degrees (° C.) than the ambient temperature by electric current supplied to the sensor coils 22. Since the heat generated by the sensor coil on the upstream side is removed by the fluid flowing through the sensor pipe 21 and conveyed to the downstream side, there is a difference in temperature between the sensor coils 22 on the upstream and downstream sides. Since temperature change leads to the change of a resistance of a sensor coil, the mass flow of the fluid can be determined by measuring the change of voltage at an intermediate point of the sensor coils 22 between the upstream and downstream sides.

Such a measurement circuit is disclosed by FIG. 6 of J. Phys. E. Sci. Instrum., Vol. 15 (1982), 215. The sensor coils Ru, Rd on both upstream and downstream sides, which are wound around the sensor pipe 21, are direct-connected, and the direct-connected sensor coils Ru, Rd are parallel-connected together with direct-connected reference resistances R1, R2 to a constant-current power supply. The change of voltage (diagonal voltage) between the connect point of the sensor-coils Ru, Rd on the upstream and downstream sides and the connect point of the reference resistances R1, R2 is measured to determine the mass flow of the fluid. Electric current is supplied to the sensor coils Ru, Rd such that their temperatures are higher than the ambient temperature by several tens of degrees (° C.) when a fluid flows through the sensor pipe 21. At this time, diagonal voltage is zero. When a fluid flows through the sensor pipe 21, the sensor coils Ru on the upstream side is cooled by the fluid, whereby the resistance of the sensor coil Ru becomes smaller. On the other hand, the sensor coil Rd on the downstream side is heated by the heated fluid, whereby the resistance of the sensor coil Rd becomes larger. As a result, a diagonal voltage becomes detectably larger, making it possible to detect it to determine the mass flow of the fluid.

Alternatively, electric current necessary for compensating the temperature change of the sensor coils due to the fluid flowing through the sensor pipe may be supplied to the sensor coils to measure the voltage change of the sensor coils in order to determine the mass flow of the fluid. Such a measurement circuit is disclosed in Japanese Patent Laid-Open No. 61-128123. The measurement circuit comprises sensor coils Ru, Rd wound around the sensor pipe on the upstream and downstream sides, with constant-temperature circuits separately disposed for including each sensor coil Ru, Rd, whereby the sensor coils Ru, Rd are kept at temperatures higher than the ambient temperature by certain degrees. Electric current is supplied to the sensor coils such that it compensates the temperature change of the sensor coils by the fluid flowing through the sensor pipe, and the voltage change is detected to determine the mass flow of the fluid. When a gas temperature and an ambient temperature are kept constant, the mass flow of the fluid can be determined from the voltage change.

As described in Japanese Patent Laid-Open No. 1-150817, each of the sensor coils Ru, Rd may be direct-connected to each of ambient temperature-detecting coils Rtu, Rtd, and temperature difference between the sensor coils and the ambient temperature may be kept constant, such that the temperature change of the ambient temperature has only slight influence, if any, on the measurement of the mass flow of the fluid.

Figure 6:
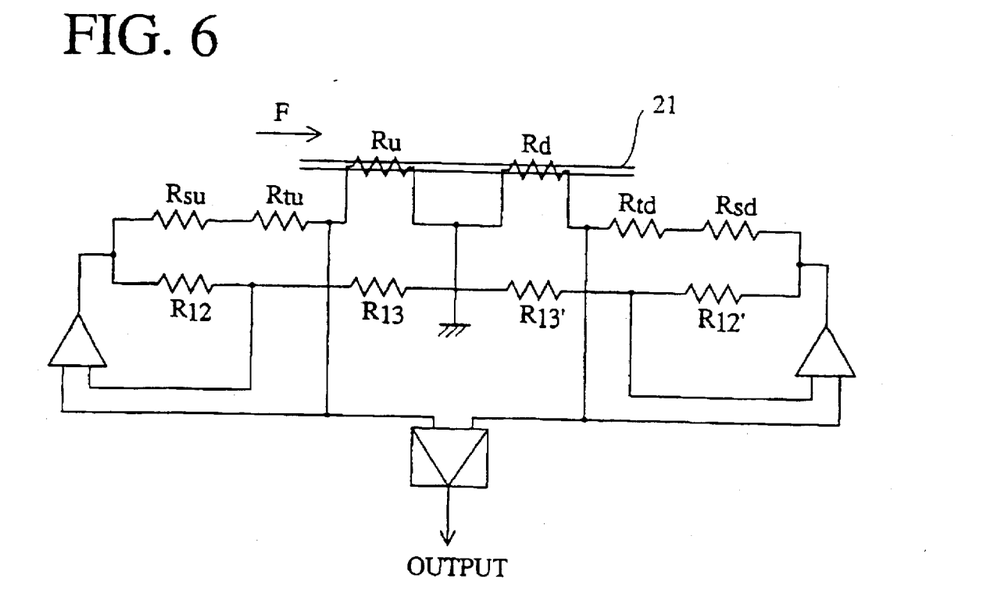
FIG. 6 is a circuit for measuring a mass flow with sensor coils.

FIG. 6 shows a major portion of the circuit in which sensor coils Ru, Rd are wound around a sensor pipe 21 on the upstream and downstream sides. The ambient temperature-detecting coils Rtu, Rtd are the same as the sensor coils Ru, Rd, and temperature difference-setting resistances Rsu, Rsd and bridge resistances $R_{12}$, $R_{13}$, $R_{12'}$, $R_{13'}$ have small temperature coefficients. Ru, Rtu and Rsu are direct-connected, and Rd, Rtd and Rsd are direct-connected, forming each side of each bridge on the upstream and downstream sides. Electric current is supplied to the sensor coils Ru, Rd to keep them higher than the ambient temperature by certain degrees. When a fluid flows through the sensor pipe 21 in the direction F, the temperatures of Ru and Rd change, and thus a diagonal voltage of each bridge changes, causing electric current to flow such that the temperatures of Ru and Rd are returned to the original ones. Thus, by measuring the difference in voltage between the bridge on the upstream side and the bridge on the downstream side, the mass flow is determined. In this sensor, since a difference between the sensor temperature and the ambient temperature is kept constant, output is always determined by the mass flow.

In any methods, what is measured by the sensor coils is the amount of heat removed by the fluid flowing through the sensor pipe, which is proportional to the difference between the sensor coil temperature and the fluid temperature and to the mass flow of the fluid. If the difference between the sensor coil temperature and the fluid temperature (namely, ambient temperature) is kept constant with an ambient temperature-detecting coil, the amount of heat removed would be variable only with the mass flow of the fluid. Accordingly, the mass flow of the fluid can be obtained by measuring the amount of heat removed.

The measurement errors of the mass flow are desirably within ±1% of the full-scaled flow rate. When the temperature of the valve casing increases from the ambient temperature by 2° C. and 4° C., respectively, the measurement errors are 0.9% and 2.0%, respectively. When the temperature compensation is performed with an ambient temperature-detecting coil, the measurement errors are reduced to as small as 0.3% and 1.0%, respectively. Accordingly, to achieve the measurement errors within 1.0%, the temperature elevation should be within 2° C. if there is no temperature compensation, and within 4° C. if there is temperature compensation.

The electromagnetic actuator 3 of the mass flow controller according to the present invention will be described in detail below. Mounted at a position opposing the valve seat 14 is a diaphragm 15 made of a spring material. A combined spring force of a backup leaf spring 31 disposed at an intermediate position of a valve rod 35 and a diaphragm 15 forcibly causes the diaphragm 15 to fluid-tightly abut the valve seat 14 in the case of a normally closed (NC) valve. The upper stationary yoke 32 of the electromagnetic actuator 3 comprises a housing 321, a housing cap 322 for closing an upper end of the housing 321, and a gap-controlling member 323 threadably engaging the housing cap 322 and extending downward, all being made of a soft magnetic material having a high magnetic flux density. The electromagnetic coil 33 for energizing the stationary yoke 32 is wound around a coil bobbin inserted into a space between the housing 321 of the stationary yoke 32 and the gap-controlling member 323.

The movable yoke 34 having a high magnetic flux density is movable up and down in the housing 321 with a small gap G between the movable yoke 34 and the gap-controlling member 323. The movable yoke 34 is fixed at the lower end thereof to a valve rod 35 comprising a steel ball 351 and a diaphragm spacer 352, and the movement of the movable yoke 34 is conveyed to the diaphragm 15 via the valve rod 35. Each of the movable yoke 34 and the valve rod 35 is slidably movable in the stationary yoke housing 321 and a diaphragm holder 36, with bearings therebetween. The electromagnetic actuator 3 having such a structure is fastened with bolts to the valve casing 1 via a lid 4. A periphery of the diaphragm 15 is fixed by a lower surface of the diaphragm holder 36 and an annular ring projection 16. Also, a periphery of the leaf spring 31 is fixed by an upper surface of the diaphragm holder 36 and the lid 4, and an inner portion of the leaf spring 31 is mounted to the valve rod 35 by a threaded annular ring member 354.

The valve element is forced to fluid-tightly abut the valve seat at a certain strength in the NC valve, while it is separated away from the valve element seat in the normally open (NO) valve. Explanation will be made below with respect to the NC valve shown in FIG. 1, but the same is true of the NO valve except that the direction of a bias force is opposite.

Figure 4:
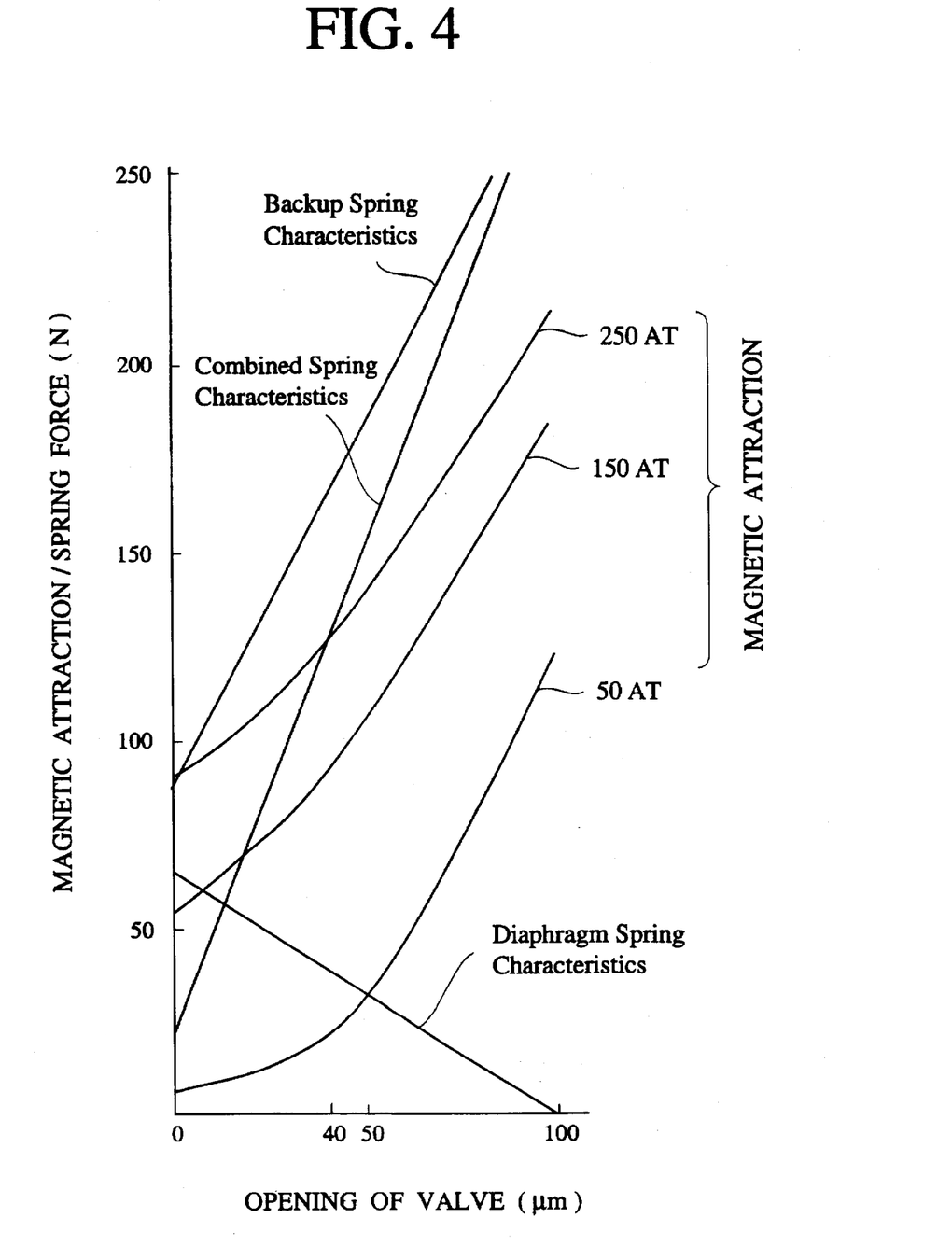
FIG. 4 is a graph showing the relation between a magnetic attraction force (spring force) and the open degree of a valve.

As shown in FIG. 4, the spring force of the diaphragm 15 is directed upward, namely in the direction away from the valve seat 14; in other words, the original position of the diaphragm 15 is deviated upward from the closed position. In such a case, it is said that the diaphragm 15 is biased away from the valve seat 14. On the other hand, the spring force of the backup leaf spring 31 is directed downward, namely in the direction toward the valve seat 14; in other words, the original position of the backup leaf spring 31 is biased toward the valve seat 14. Thus, the spring force of the diaphragm 15 is combined with the spring force of the backup leaf spring 31 to generate a spring force which exerts a load of several tens of N to the valve element 15 in contact with the valve seat 14 in a completely closed state. With this closing force due to the combined spring force, the fluid is prevented from leaking between the valve element 15 and the valve seat 14, and the valve element 15 is prevented from moving by change of pressure on the primary and/or secondary side. As the valve element 15 is separated from the valve seat 14, the displacement of the leaf spring 31 becomes larger, resulting in a larger combined spring force.

The stationary yoke 32 and the movable yoke 34 are magnetized by electric current supplied to the electromagnetic coil 33. For instance, assuming that the number of winding of the electromagnetic coil 33 is 3500 turns (200 Ω), a magnetomotive force of 50 AT, 150 AT and 250 AT, respectively can be obtained at electric current of 14 mA, 43 mA and 71 mA, respectively. With this magnetomotive force, the stationary yoke 32 and the movable yoke 34 are magnetized to generate a magnetic attraction force in a gap G between the stationary yoke 32 and the movable yoke 34. The smaller the gap G, the larger the magnetic attraction force. Namely, as the diaphragm 15 is opened to a larger extent, the movable yoke 34 moves upward, thereby making the gap G between the stationary yoke 32 and the movable yoke 34 smaller. As a result, the magnetic attraction force changes along a curve shown in FIG. 4 in the case of a soft magnetic alloy called "Permendure."

As electric current supplied to the electromagnetic coil 33 increases gradually from zero, the magnetic attraction force increases along the curve shown in FIG. 4 (in the case of "Permendure"). For instance, the magnetomotive force is 250 AT at electric current of 71 mA, and the magnetic attraction force and the spring force are balanced at a point at which the curve of the magnetic attraction force at a magnetomotive force of 250 AT intersects the curve of the combined spring force. Thus, balance is achieved at a position at which the diaphragm 15 is opened by 40 µm. By changing electric current supplied to the electromagnetic coil 33, the open degree of the valve element 15 can be arbitrarily controlled. When the stationary yoke 32 and the movable yoke 34 are made of electromagnetic soft iron or Permalloy (78% Ni), the resulting magnetic flux density is smaller than that obtained with Permendure. Thus, the magnetic attraction force is inevitably small, making it necessary to use a spring having a larger resilience.

Figure 2:
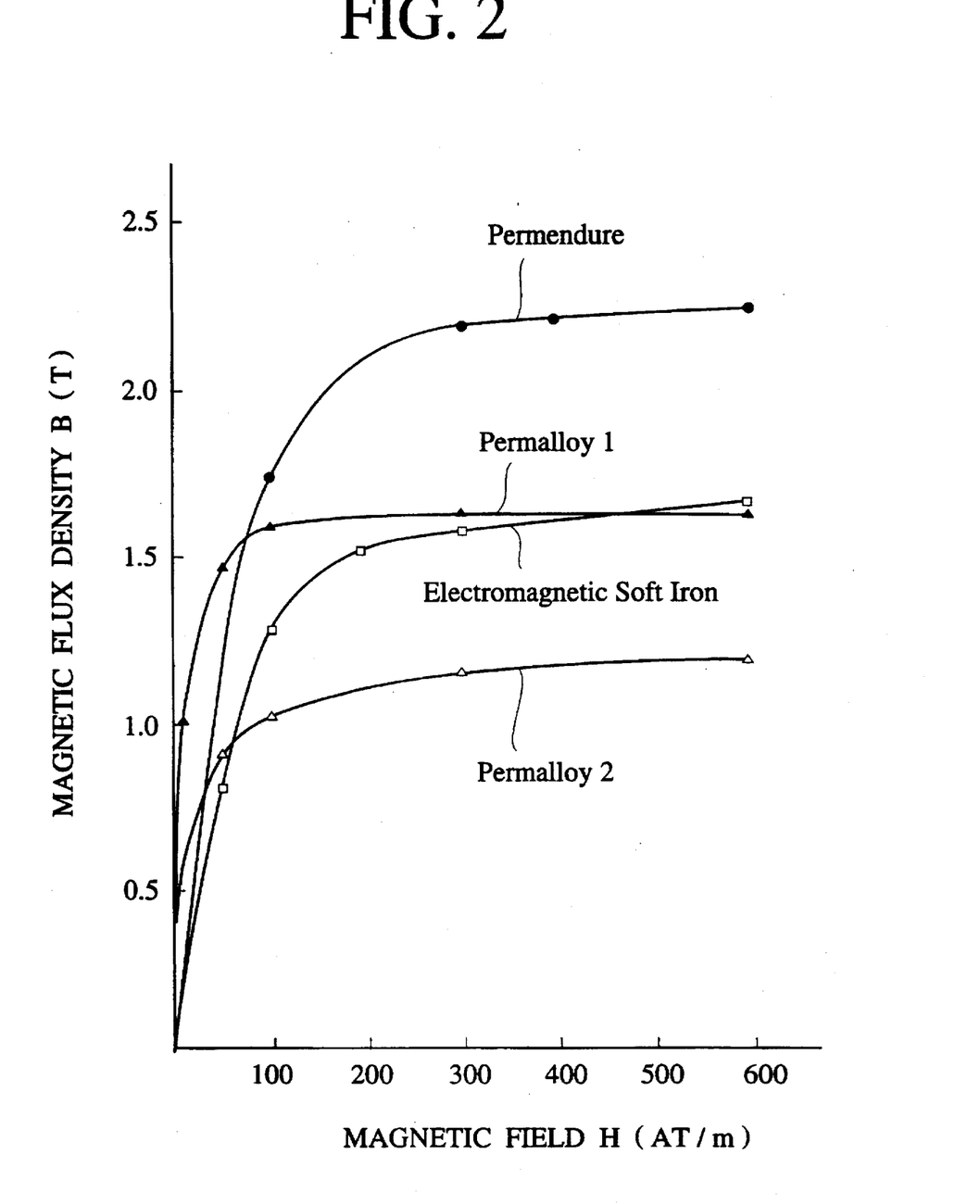
FIG. 2 is a graph showing B–H curves of various soft magnetic materials.

FIG. 2 shows B–H curves of various soft magnetic materials, in which magnetic flux densities B (T) change with a magnetic field H (AT/m) as follows:

TABLE 1

| Magnetic Materials | Magnetic Flux Density B (T) at AT/m | | | Squareness Ratio | |
|---|---|---|---|---|---|
|  | 50 | 100 | 300 | $B_{300}/B_{50}$ | $B_{300}/B_{100}$ |
| Permendure[1] | 1.13 | 1.72 | 2.18 | 1.93 | 1.27 |
| Permalloy 1[2] | 1.45 | 1.57 | 1.6 | 1.10 | 1.02 |
| Permalloy 2[3] | 0.9 | 1.0 | 1.12 | 1.24 | 1.12 |
| Electromagnetic Soft Iron | 0.8 | 1.25 | 1.56 | 1.95 | 1.25 |

Note
[1] 49% Co-2% V.
[2] 78% Ni.
[3] 36% Ni.

Figure 3:
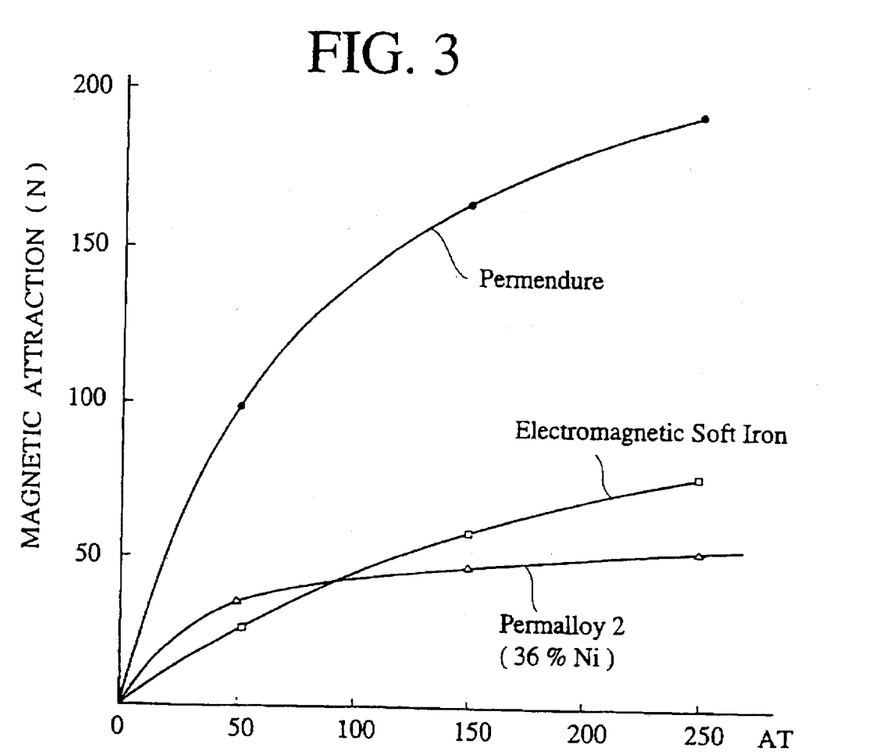
FIG. 3 is a graph showing the relation between an magnetomotive force and a magnetic attraction force in various soft magnetic materials.

These soft magnetic materials were used for the stationary yoke 32 and the movable yoke 34 of the electromagnetic actuator 3 in the mass flow controller of the present invention to compare their magnetic attraction forces. The results are shown in FIG. 3. In the case of Permendure, the resulting magnetic attraction force was about 100 N at 50 AT, and 190 N at 250 AT. In the case of electromagnetic soft iron, it was 25 N at 50 AT, and 75 N at 250 AT. Thus, a magnetic attraction force changed largely by changing the magnetomotive force when Permendure or electromagnetic soft iron was used. On the other hand, in the case of Permalloy of 36% Ni, the magnetic attraction force was 32 N at 50 and 50 N at 250 AT, indicating that the magnetic attraction force did not substantially change with the magnetomotive force.

Incidentally, Permendure used here had a composition of 49 weight % of Co, 2 weight % of V, and balance substantially Fe and incidental impurities. In general, Permendure includes 40–55 weight % of Co, 1–4 weight % of V, the balance being substantially Fe and incidental impurities. V is added for improving workability, but if the mount of V exceeds 4 weight %, Permendure shows a poor coercive force.

Whether or not the change of the magnetomotive force affects the magnetic attraction force largely depends on the squareness ratio of the B–H curve. Permendure and electromagnetic soft iron show poor squareness ratios, $B_{300}/B_{50}$ being 1.93 for Permendure and 1.95 for electromagnetic soft iron. Permalloy shows a good squareness ratio, $B_{300}/B_{50}$ being less than 1.5 for any types of Permalloy. Since the magnetic attraction force is balanced with the spring force in the electromagnetic actuator 3, the magnetic attraction force should vary by changing the electric current. Accordingly, it is preferable that the soft magnetic material has a poor squareness ratio. For instance, when the magnetic field intensity is changed from 50 AT/m or 100 AT/m to 300 AT/m, the magnetic flux density of the soft magnetic material preferably varies drastically. It is preferable in the present invention that the squareness ratio $B_{300}/B_{50}$ is 1.5 or more, resulting in drastic change of magnetic attraction force with electric current. Since the magnetic flux density of the soft magnetic material does not change largely at 300 or higher, consideration needs to be made up to 300 AT/m.

The magnetic flux density at 300 AT/m is 1.5 T or more for all of Permendure, Permalloy 1 and electromagnetic soft iron, meaning that these soft magnetic materials can generate a large magnetic attraction force with a small magnetomotive force. With the electromagnetic coil of 3500 turns and 200 Ω, the magnetomotive forces of 200 AT and 250 AT, respectively are obtained at electric current of 55 mA and 71 mA, respectively, and at voltage of 11 V and 15 V, respectively. By using a soft magnetic material such as Permendure showing a magnetic flux density of 2.0 T or more at 300 AT/m, a larger magnetic attraction force can be obtained.

Figure 5:
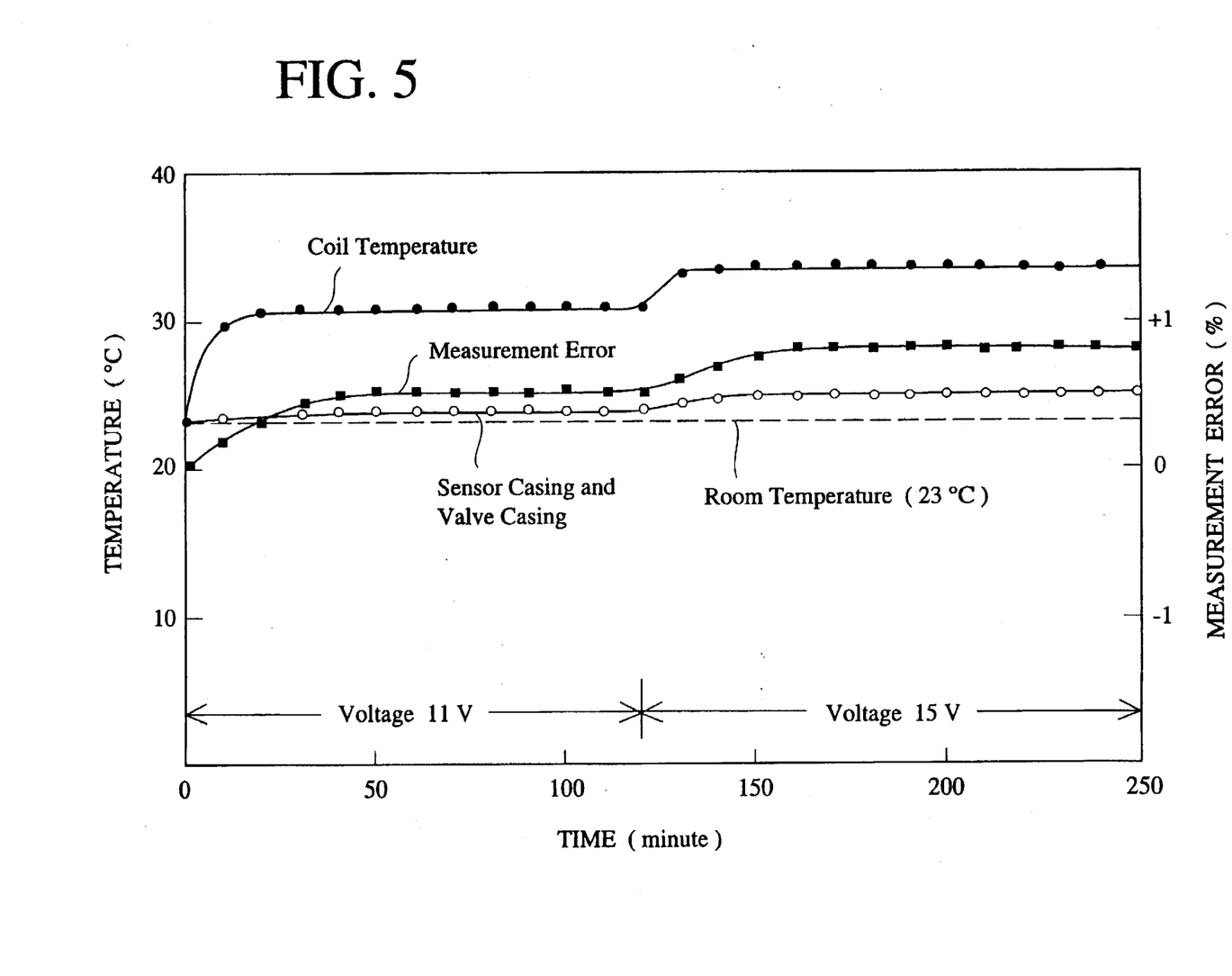
FIG. 5 is a graph showing the temperature of an electromagnetic coil and a valve casing and the measurement errors of the mass flow in current-supplying experiments.

DC of 1 V was applied to the electromagnetic coil in the electromagnetic actuator of the mass flow controller of the present invention and increased to 15 V after 120 minutes, to measure the temperatures of the electromagnetic coil and the valve casing. The results are shown in FIG. 5. The ambient temperature was 23° C., and the coil portion was heated to 31° C. at 11 V and 34° C. at 15 V, while the temperature of the valve casing was 24° C. at 11 V and 24.7° C. at 15° C. Thus, the temperature elevation of the valve casing was within 2° C. The measurement errors of the sensor in the mass flow controller whose full scale is 100 ml/min for a nitrogen gas are shown in FIG. 5. As is clear from FIG. 5, the measurement errors are +0.5% and +0.8% at 11 V and 15 V, respectively.

Thus, the temperature elevation of the valve casing can be suppressed in the present invention. With a small magnetomotive force, $B_{300}$ is 1.5 T or more, meaning a large magnetic attraction force.

The mass flow controller has been explained above, the mechanism of the present invention is also effective for an electromagnetic valve. In the case of an NC valve, the valve element is closed by a combined spring force of a diaphragm valve means and a leaf spring, and is opened by moving a movable yoke and thus the diaphragm valve means in an opposite direction to the combined spring force by energizing the electromagnetic coil. By applying the present invention to such a valve, a large force can be obtained by a small electric current, thereby enabling it to obtain a large stroke of movement. In such a case, heat generation can be minimized.

As described in detail above, the mass flow controller and the electromagnetic valve according to the present invention can provide a large valve element-driving force with a small electric current supply, thereby suppressing heat generation. Accordingly, when used as a mass flow controller, its measurement errors can be minimized.

Although the present invention has been explained referring to the drawings attached hereto, it should be noted that the present invention is not restricted to embodiments shown in them, and that any modification can be made unless departing from the scope the present invention defined in the claims attached hereto.

What is claimed is:

1. A mass flow controller comprising:
   (a) a valve casing having a flow path for a fluid;
   (b) a diaphragm valve means disposed in said flow path for adjusting the degree of opening said flow path, said diaphragm valve means comprising a valve seat disposed in said flow path and a diaphragm biased toward said valve seat by a spring force, wherein the spring force increases proportionally with the displacement of said diaphragm from said valve seat;
   (c) an electromagnetic actuator comprising a stationary yoke made of a soft magnetic material, an electromagnetic coil for magnetizing said stationary yoke, and a movable yoke made of a soft magnetic material and movable toward said stationary yoke against the spring force by energizing said electromagnetic coil to displace said diaphragm from said valve seat to a point at which the magnetic attraction force of said electromagnetic coil and the spring force are balanced, both of said stationary yoke and said movable yoke having a magnetic flux density of 1.5 T or more at 300 AT/m;
   (d) a sensor pipe disposed on said upstream side of said diaphragm valve means and bypassing said flow path; and
   (e) a pair of sensor colts wound around said sensor pipe on the upstream and downstream sides.

2. The mass flow controller according to claim 1, wherein both of said stationary yoke and said movable yoke have a magnetic flux density of 2.0 T or more at 300 AT/m.

3. The mass flow controller according to claim 2, wherein a ratio of a magnetic flux density at 300 AT/m ($B_{300}$) to a magnetic flux density at 50 AT/m ($B_{50}$) is 1.5 or more with respect to both of said stationary yoke and said movable yoke.

4. The mass flow controller according to claim 1, wherein said stationary yoke and said movable yoke are made of the same soft magnetic material having a composition of 40–55 weight % of Co, and 1–4 weight % of V, the balance being substantially Fe and incidental impurities.

5. An electromagnetic valve comprising a valve casing having a flow path for adjusting the degree of opening said flow path, and an electromagnetic actuator for operating said valve element, wherein said valve element is biased toward a valve seat disposed in said flow path by a spring force which proportionally increases with the displacement of said valve element from said valve seat;

wherein said electromagnetic actuator comprises a stationary yoke made of a soft magnetic material, an electromagnetic coil for magnetizing said stationary yoke, and a movable yoke made of a soft magnetic material and movable toward said stationary yoke against the spring force by energizing said electromagnetic coil to displace said valve element from said valve seat to a point at which the magnetic attraction force of said electromagnetic coil and the spring force are balanced; and wherein both of said stationary yoke and said movable yoke have a magnetic flux density of 1.5 T or more at 300 AT/m, a ratio of magnetic flux density at 300 AT/m ($B_{300}$) to a magnetic flux density at 50 AT/m ($B_{50}$) being 1.5 or more.

6. The electromagnetic valve according to claim 5, wherein both of said stationary yoke and said movable yoke have a magnetic flux density of 2.0 T or more at 300 AT/m.

7. The electromagnetic valve according to claim 5, wherein said stationary yoke and said movable yoke are made of the same soft magnetic material having a composition of 40–55 weight % of Co, and 1–4 weight % of V, the balance being substantially Fe and incidental impurities.

* * * * *